United States Patent [19]

Dorren

[11] 4,062,547

[45] Dec. 13, 1977

[54] AUTOMATIC CONTROL FOR PHONOGRAPHS PLAYING RECORDS OF DIFFERENT SPEEDS

[75] Inventor: Louis Dorren, San Mateo, Calif.

[73] Assignee: Quadracast Systems, Inc., San Mateo, Calif.

[21] Appl. No.: 714,033

[22] Filed: Aug. 13, 1976

[51] Int. Cl.[2] .................. G11B 19/26

[52] U.S. Cl. .................. 274/9 A; 274/10 S

[58] Field of Search .................. 274/9 A, 39 A, 39 R, 274/1 R, 10 S, 10 SS

[56] References Cited

U.S. PATENT DOCUMENTS

| | | | |
|---|---|---|---|
| 2,632,650 | 3/1953 | Offutt | 274/9 A |
| 2,718,399 | 9/1955 | Martin et al. | 274/9 A |
| 2,806,704 | 9/1957 | Burdett | 274/1 R |
| 2,885,208 | 5/1959 | Pranter | 274/9 A |
| 3,547,449 | 12/1970 | Dennis | 274/9 A |

FOREIGN PATENT DOCUMENTS

| | | | |
|---|---|---|---|
| 1,274,371 | 8/1968 | Germany | 274/9 A |

*Primary Examiner*—Richard E. Aegerter
*Assistant Examiner*—John W. Shepperd
*Attorney, Agent, or Firm*—Robert G. Slick

[57] ABSTRACT

An automatic means is provided for setting a phonograph record player to the proper speed, depending on the type of record placed thereon. A magnet detection circuit is employed in the player and a magnetic adapter is employed for 45 RPM records.

6 Claims, 3 Drawing Figures

AUTOMATIC CONTROL FOR PHONOGRAPHS PLAYING RECORDS OF DIFFERENT SPEEDS

SUMMARY OF THE INVENTION

At the present time substantially all phonograph records play at either 45 or 33 ⅓ RPM. The 33 ⅓ records normally employ a small hole which fits precisely over a small spindle on the player or changer. The 45 records are primarily adapted to be played on a changer having a large spindle, and if they are played on players having a small spindle, an adapter must be employed. In the case of automatic players, the adapter may snap into the large center hole and effectively become part of the record. In the case of commercial equipment, such as is employed in broadcasting studios, a changer is ordinarily not employed and the player is provided with a single adapter which can be either placed over the small spindle for palying a 45 record or placed in a receptacle on the player base for a 33 ⅓ record. Such adapters do not attach to the record but merely provide the proper hole size for the record.

Players normally have a speed setting lever which sets the proper speed and may also control the proper stylus placement.

In switching from one sized record to another, it is annoying to require an adjustment of the record player each time one goes from one size record to the other. If proper speed selection is not made, the needle may not come down at the proper place and there will be damage. At best, a speed setting which is improper will cause distorted sound.

In accordance with this invention, a simple modification is made of the changer or player which works from the adapter which is used with 45 records when they are played on a standard player having a small spindle. A completely automatic operation is assured so that if one places a 33 ⅓ record on the spindle, it will play at the proper speed and the needle will be placed at the proper place on the record, while if one places a 45 record on the turntable, again the speed will be proper as well as the needle placement.

Further, and in accordance with this invention, some record players have sufficient room under the turntable to permit magnet detection equipment to be placed adjacent to the spindle, directly under the turntable, while other turntables, such as those having a direct drive motor, do not have this clearance. As will be later apparent, the control device of the present invention is applicable to either type of player.

BRIEF DESCRIPTION OF THE DRAWINGS

In the drawings forming part of this application.

DESCRIPTION OF THE PREFERRED EMBODIMENTS

Figure 1:
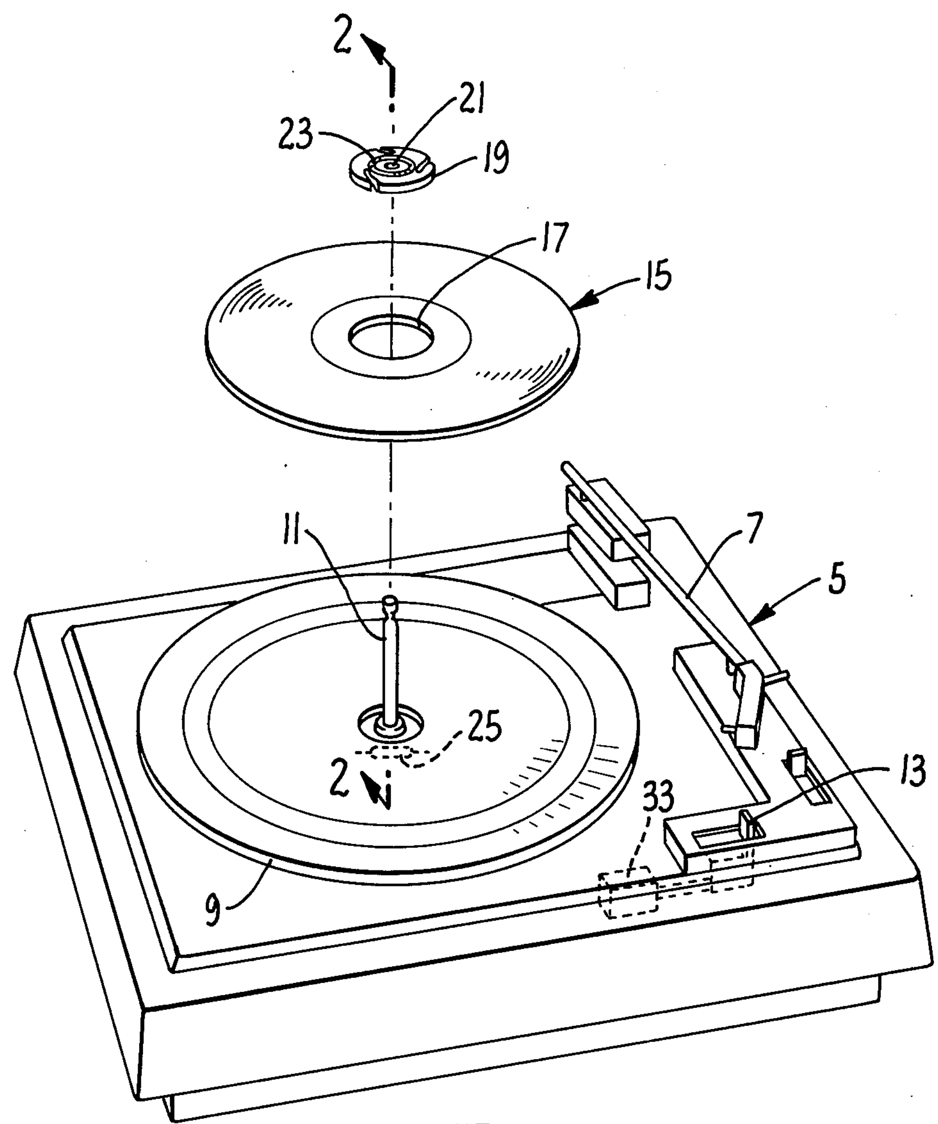
FIG. 1 is a perspective view of a phonograph record player and 45 RPM record with an adapter, all embodying the present invention.
Figure 2:
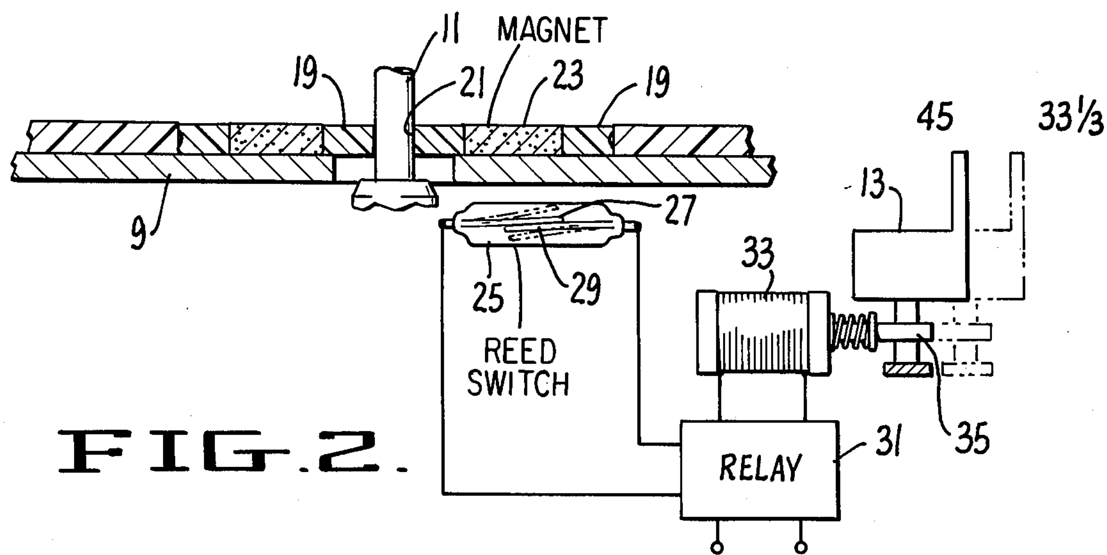
FIG. 2 is a plan view of the record and turntable, together with a schematic diagram of the circuitry involved.

Referring now to FIGS. 1 and 2 of the drawings by reference characters, there is shown a phonograph record changer generally designated 5 having the usual pick-up arm 7, and turntable 9. Turntable 9 is non-magnetic and can be of plastic or of a metal such as aluminum or brass. The turntable is provided with a small diameter spindle 11. The player 5 can be of either the single play variety wherein the spindle 11 will be short, or may be of the multiple-playing variety, such as the one illustrated, wherein spindle 11 is relatively long to hold a stack of records. A speed control 13 is provided which not only sets the speed of the turntable, but also determines the point at which the stylus will be placed with respect to the turntable. In the embodiment illustrated, the left-hand position represents a 45 RPM record, and the right-hand position represents a 33 ⅓ record, although this situation might be reversed.

A 45 RPM record 15 has a large center hole 17 so that if one wishes to play such a record on a small spindle player, it is necessary to employ the adapter 19 which may spring into the center hole 17, and which has a small hole 21 therein of proper size to fit over the spindle 11. In accordance with the present invention, the adapter 19 incorporates an annular magnet 23 located concentric to the hole 21.

Located under the turntable 9 is a magnetic reed switch 25. The reed switch is of the normally open type so that the contacts 27 and 29 will be open, as is shown in dotted lines, if no magnet is present, or of the magnet 23 is present, contacts 27 and 29 will be closed as is shown in solid lines in FIG. 2. The contacts of the magnetic reed switch are connected to a relay 31 which in turn is connected to a solenoid 33 having an armature 35 which is connected to the changeover mechanism 13. Thus, if the magnet 23 is in place, the contacts will close, forcing the mechanism 13 to the left so that the player will be set properly for a 45 RPM record. On the other hand, if one puts a 33 ⅓ record on the player, the contacts 27 and 29 will stay open so that the mechanism 13 moves or remains to the right, properly setting the phonograph for records of that speed. Obviously, only the bottom record will control the setting so that if one puts a stack of 45's on a changer, only the bottom record need be equipped with the magnetic adapter of the present invention.

Some record players embody a direct drive motor so that the space directly under the turntable cannot be utilized for the magnet detection system. Further, many systems, such as those employed in commercial radio stations, do not use changers but use single play reproducers and in such instances it is not customary to provide a snap-in insert for the 45 RPM record but instead, a small disc adapter is provided which fits over the spindle; the adapter is palced over the spindle during the time a 45 RPM record is being played, and at other times when playing a 33 ⅓ record, the adapter is placed in a convenient receptacle which is provided in the base of the turntable.

Figure 3:
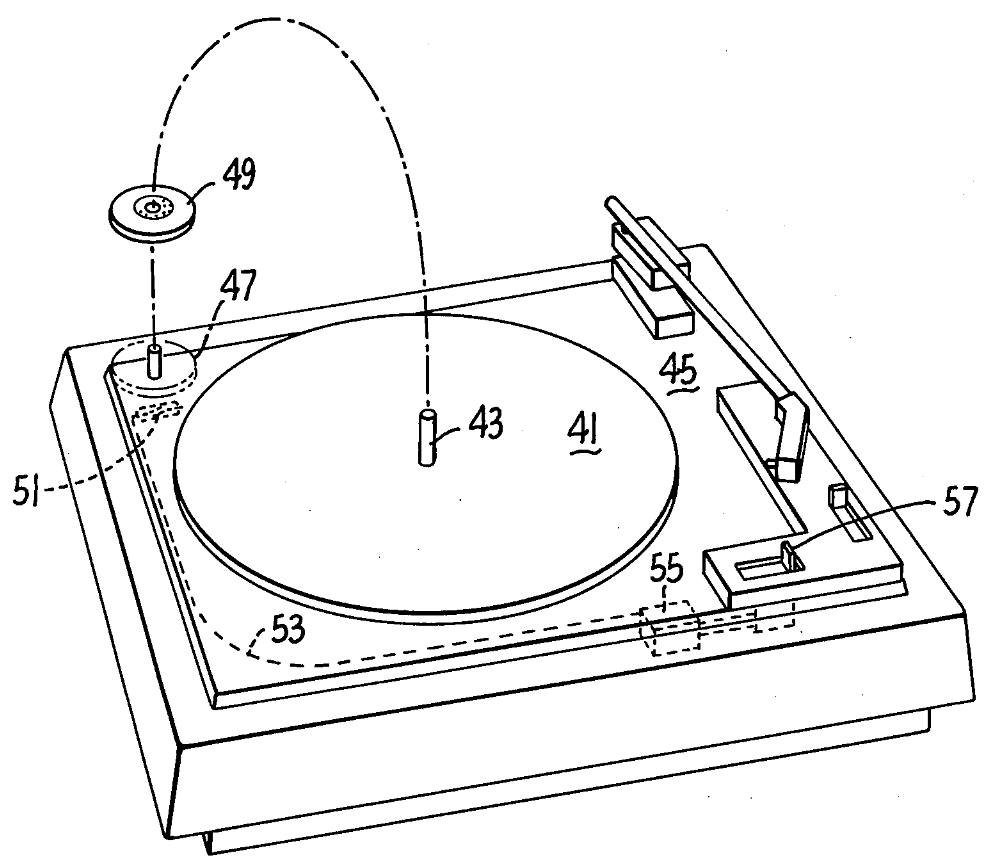
FIG. 3 is a perspective view of a phonograph record player of the single play type wherein the magnet detection device is placed adjacent to an adapter receptable.

FIG. 3 illustrates a single record player wherein it is not necessary to utilize the space directly under the turntable for the magnet detection circuit. This figure also illustrates the use of an adapter which is not fastened to the record but which is merely placed on the turntable for 45 RPM records and placed in a receptacle when records of another speed are being played. Here the turntable 41 is provided with a small, single-play spindle 43. The turntable is mounted on a base 45 having a cup-like receptacle 47 therein for the reception of the adapter 49 when it is not in use. Mounted under the cup 47 is a magnet detector 51 connected by suitable wiring 53 to a solenoid 55 which is adapted to actuate the speed selector 57. The adapter 49 can be in the form of an annular magnet or may merely incorporate one or more bar magnets in its structure. Here the actuation is the opposite of that previously described. When the adapter 49 is in the receptacle 47, the magnet detecting means 51 detects this presence and sets the speed selector for 33 ⅓ RPM. On the other hand, when the adapter 49 is missing from the receptacle 47, the magnet detector 51 detects the absence of the magnet and sets the player for 45 RPM.

Although certain specific embodiments of the invention have been illustrated, it will be obvious to those skilled in the art that many variations can be made in the exact structure shown without departing from the spirit of this invention. Instead of the magnetic reed switch 25, one might employ a Hall effect detector or other metal or magnet detecting means.

I claim:

1. In a phonograph record player having the usual turntable with a small diameter spindle and having a first mode for playing a first type of record having a small spindle hole at a first speed, and a second mode for playing a second type of record at a second speed, said second type of record having a large spindle hole and requiring an adapter to adapt the record to said small diameter spindle, said player having a lever for switching said player from the first mode to the second mode, the improvement comprising:

a. an annular adapter having an outer diameter to fit said large spindle hole and an inner diameter to fit said small diameter spindle for said second type of record and having magnetic means incorporated therein;

b. magnet detecting means in said player;

c. switching means activated by said magnet detecting means adapted to switch said lever from one mode to the other, depending on the position of said adapter with respect to said magnet detecting means.

2. The changer of claim 1 wherein said magnet detecting means comprises a reed switch.

3. The changer of claim 1 wherein said first speed is 33 ⅓ RPM and said second speed is 45 RPM.

4. The player of claim 1 wherein said magnet detecting means is directly under said turntable, adjacent to said spindle.

5. The player of claim 1 having a receptacle for said annular adapter wherein said adapter can be placed in a first position on said spindle and a second position in said adapter and wherein said magnet detecting means is located adjacent to said receptacle.

6. The player of claim 1 wherein the adapter snaps into the hole of a record having a large hole.

* * * * *